Aug. 25, 1931. A. M. NIVEN 1,820,629
SLEEVE VALVE AND METHOD OF MAKING SAME
Filed Jan. 20, 1928. 2 Sheets-Sheet 1
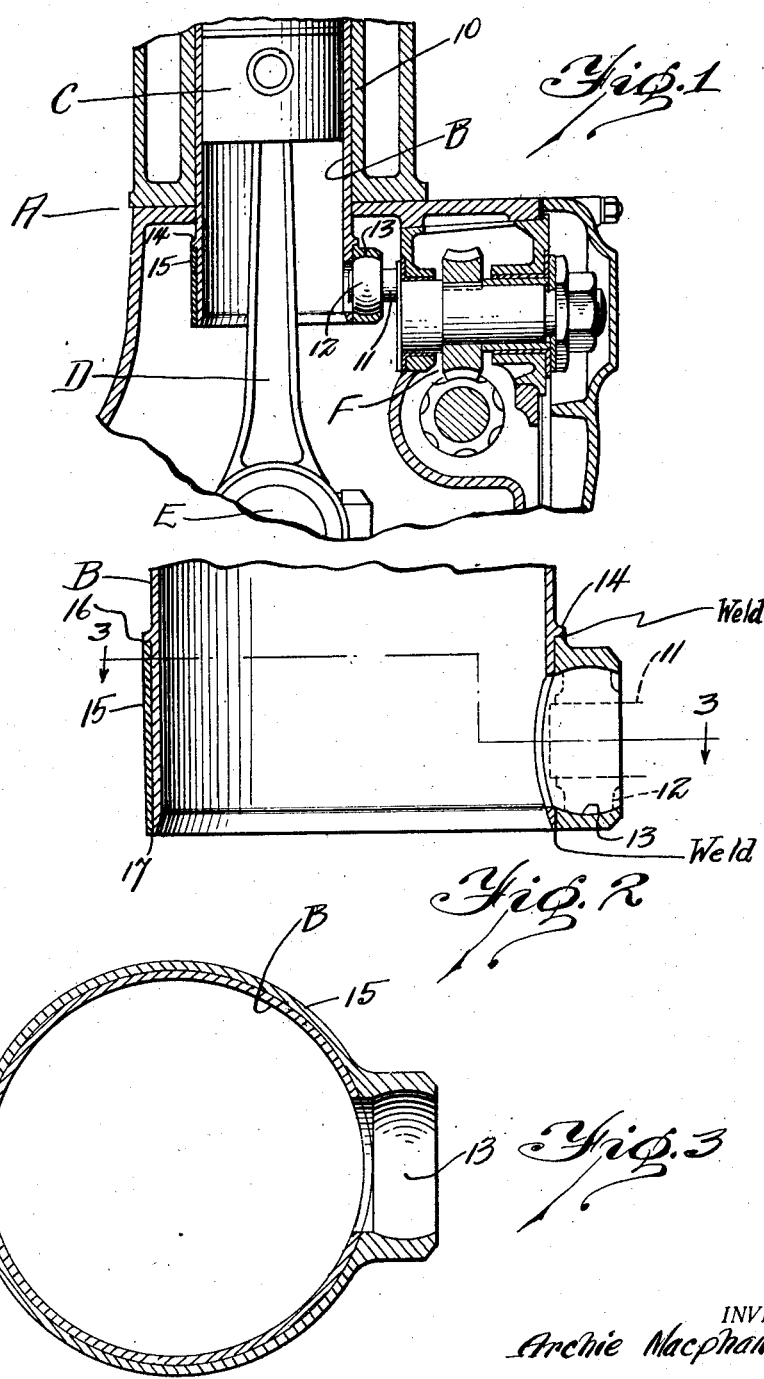

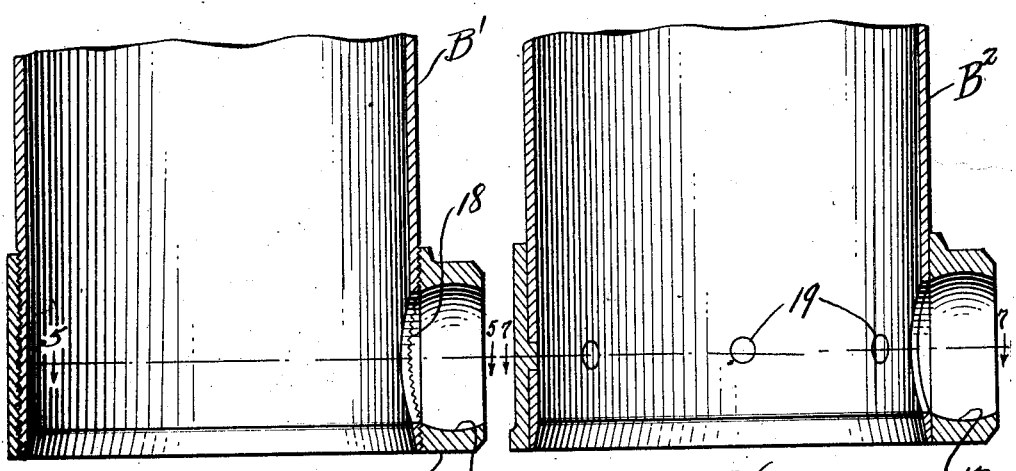
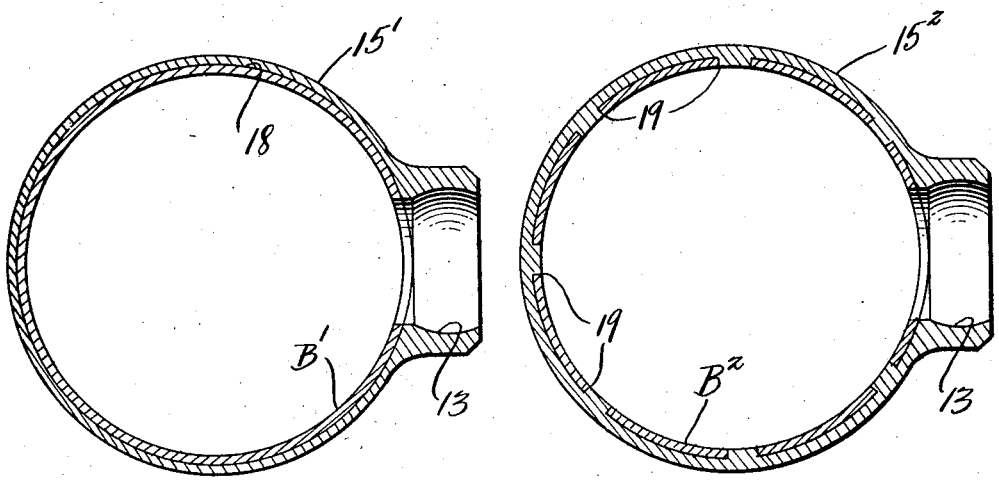

Patented Aug. 25, 1931

1,820,629

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE VALVE AND METHOD OF MAKING SAME

Application filed January 20, 1928. Serial No. 248,123.

This invention relates to internal combustion engines and refers more particularly to an improved sleeve valve and method of making same.

Heretofore sleeve valves have been generally made of cast iron although steel sleeves or other sleeves constructed of materials having the general characteristics of steel as distinguished from cast iron have been used in many types of sleeve valve engines. It is known that steel sleeves may be made much lighter and stronger than cast metal sleeves thus reducing the inertia forces incident to operating the engine. Difficulty has been experienced, however, in suitably and conveniently securing the driving lug or other sleeve driving means to the steel sleeve valve. Such a problem does not arise in the use of cast iron sleeves since such lugs or driving means may be cast integrally with the sleeves. A further difficulty experienced in connection with the use of steel sleeves resides in conveniently and adequately reinforcing the lower end of the sleeve. The steel sleeve, due to its thinness must generally be reinforced at its driven end to prevent undue twisting and distortion.

I have provided means and methods whereby a steel sleeve valve or a valve of similar general characteristics may be conveniently and cheaply manufactured, overcoming the difficulties experienced in the past.

A further object of my invention resides in the provision of an improved sleeve valve construction.

With the foregoing and other objects in view my invention resides in the novel combination and arrangement of parts more particularly hereinafter described and claimed.

Referring to the accompanying drawings in which like reference characters indicate corresponding parts throughout the several views, Fig. 1 is a sectional view of a sleeve valve engine showing one driving mechanism for the sleeve valve, Fig. 2 is a sectional view of my improved sleeve construction, Fig. 3 is a sectional view along 3—3 of Fig. 2, Fig. 4 is a view corresponding to Fig. 2 illustrating a modification, Fig. 5 is a sectional view along 5—5 of Fig. 4, Fig. 6 is a view corresponding to Figs. 2 and 4 but showing a further modification, and Fig. 7 is a view along 7—7 of Fig. 6.

In the drawings reference character A represents a typical sleeve valve engine, one of the cylinders 10 having associated therewith one or more sleeve valves B, piston C, connecting rod D, and crankshaft E. In Fig. 1 I have illustrated a single sleeve valve engine of the "Burt-McCollum" type where the sleeve is moved by a driving mechanism F in a combined reciprocating and oscillating path with respect to the sleeve and cylinder axes whereby the sleeve and cylinder ports are caused to function in a well known manner. In this type of mechanism it is customary to provide a sleeve driving crank 11 carrying a ball 12 which engages a socket 13 carried by the sleeve B, the crank 11 being slidable relative to the ball to permit the aforesaid movement.

In the present invention the sleeve B is of steel or the like as distinguished from cast iron permitting the use of a relatively thinner wall section and consequently a stronger and lighter weight sleeve. The sleeve is provided with an annular rib 14 projecting outwardly therefrom. Surrounding the lower end of the sleeve is a ring 15 of steel, or other suitable metal, the upper edge of which abuts the rib 14 whereby the ring may be secured to the sleeve as by welding at 16 to the rib and at 17 to the sleeve end. In the type of sleeve illustrated the band or ring 15 is provided with the aforesaid socket 13 for actuation by the driving ball 12. By reason of this method of sleeve construction a relatively inexpensive sleeve may be produced and the resulting sleeve is light, strong, and is reinforced at its driven portion by reason of the band 15 and by the rib 14 where the latter is employed.

In Figs. 4 and 5 the sleeve B' has the general properties of the sleeve B aforesaid, but is circumferentially threaded or serrated at 18. The ring or band 15' in this instance is of duralumin, cast-iron, or the like cast (as by die-casting) in position around the sleeve and thereby anchored to the sleeve by reason of the threads or serrations 18.

In Figs. 6 and 7 the method employed and the resulting sleeve construction is in general the same as illustrated and described in connection with Figs. 4 and 5 except that the sleeve $B^2$ is provided with a series of openings 19 which are filled by the band $15^2$ when the latter is cast in position around the sleeve, thus securely anchoring the band to the sleeve.

While I have illustrated my invention in connection with a single sleeve valve engine, it will be apparent that the methods and sleeve illustrated and described may be embodied in connection with sleeve valves of other types.

What I claim as my invention is:

1. A tubular sleeve valve for internal combustion engines having an annular rib spaced above the sleeve lower end, and a ring surrounding the sleeve abutting the rib, said ring being welded to the rib and to the lower edge of the sleeve.

2. A tubular sleeve valve for internal combustion engines having an annular rib extending outwardly of the sleeve and spaced above the sleeve lower end, a driving ring surrounding and reinforcing the sleeve lower end and abutting the rib, said ring extending substantially from the sleeve lower end to the rib, said ring being permanently secured to the sleeve by welding to the rib.

3. A tubular sleeve valve for internal combustion engines having an annular rib extending outwardly of the sleeve and spaced above the sleeve lower end, a driving ring surrounding and reinforcing the sleeve lower end and abutting the rib, said ring extending substantially from the sleeve lower end to the rib, said ring being permanently secured to the sleeve by welding to the rib, and to the sleeve lower end.

In witness whereof, I hereunto subscribe my name this 17th day of January, A. D. 1928.

ARCHIE MACPHAIL NIVEN.